April 5, 1932.  A. THOMSON  1,852,135
SHOCK ABSORBER
Filed May 11, 1931   2 Sheets-Sheet 1
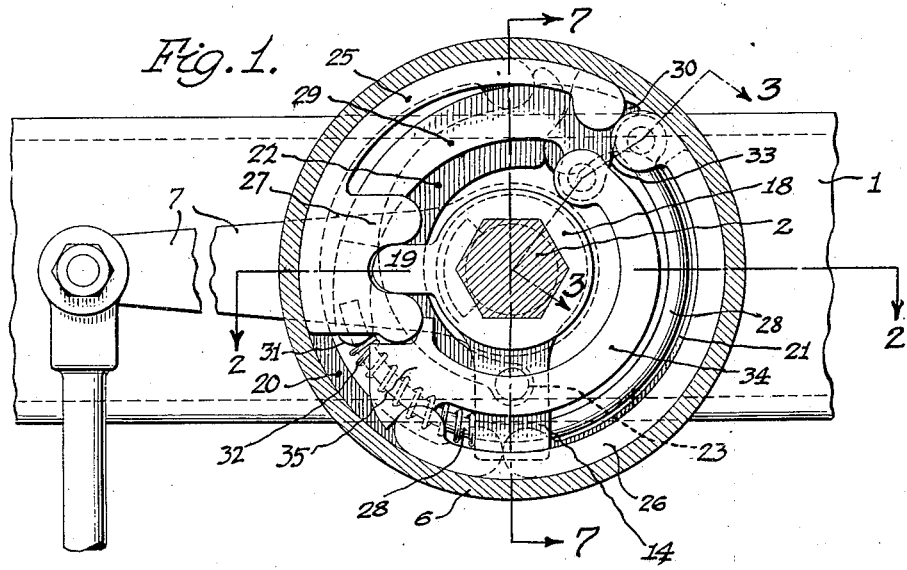
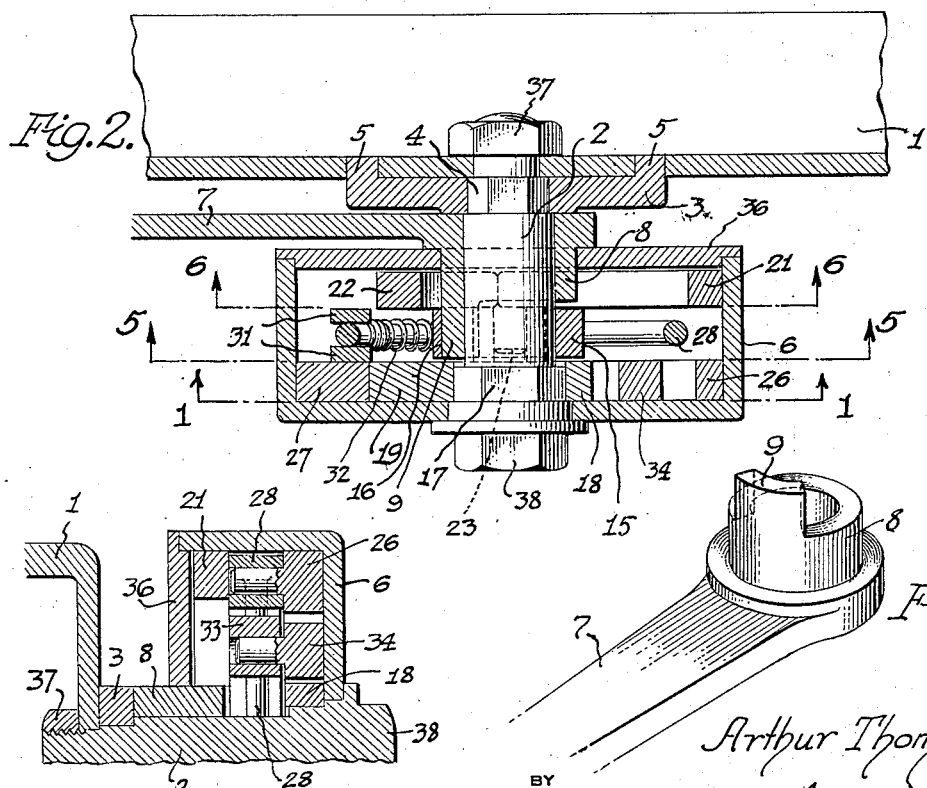
INVENTOR
Arthur Thomson,
BY
ATTORNEYS April 5, 1932. A. THOMSON 1,852,135
SHOCK ABSORBER
Filed May 11, 1931 2 Sheets-Sheet 2
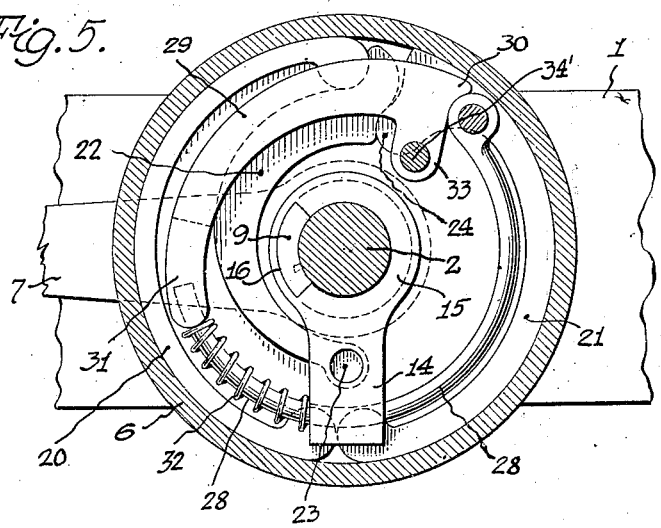
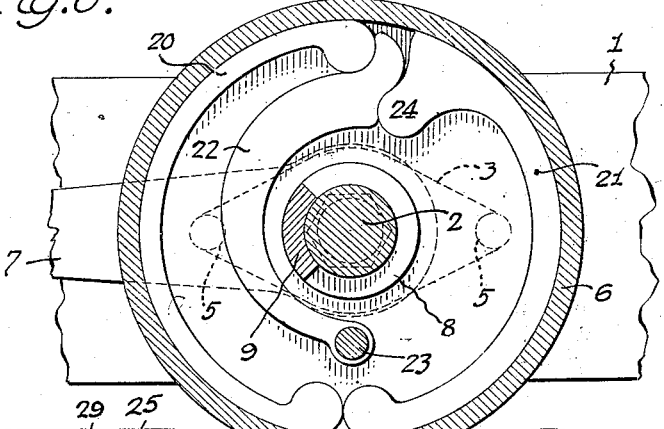
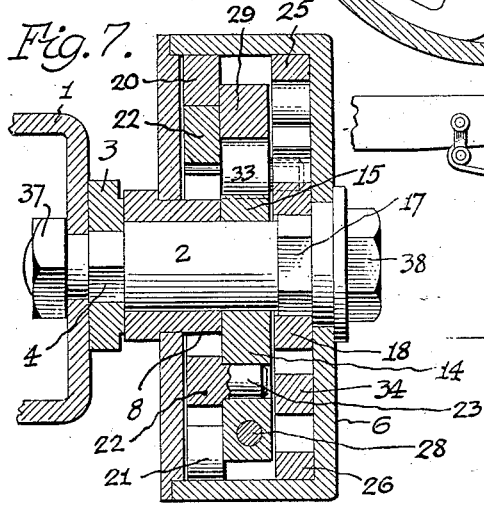
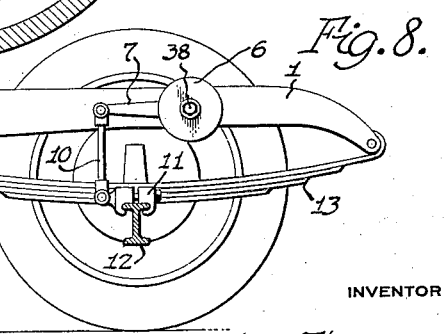
INVENTOR
Arthur Thomson,
BY
ATTORNEYS Patented Apr. 5, 1932

1,852,135

UNITED STATES PATENT OFFICE

ARTHUR THOMSON, OF SCARBORO JUNCTION, ONTARIO, CANADA

SHOCK ABSORBER

Application filed May 11, 1931. Serial No. 536,391.

The present invention pertains to a novel shock absorber designed particularly for use in connection with motor vehicles.

The principal object of the invention is to provide a device of this character which functions to absorb or cushion the recoil or rebound action of a vehicle spring after the latter has been compressed. The device moreover is substantially inactive while the vehicle spring moves from normal position into full compression.

More particularly, the device is constructed to exert its greatest braking or shock absorbing action at the beginning of the recoil movement and to diminish this action as the recoil movement continues to its end. Thus, the maximum braking action is available when most necessary and, by its gradually decreasing effectiveness, avoids an abrupt check or stoppage of the recoil movement while effectively cushioning this movement in a manner not detrimental to the comfort of the passengers in the vehicle.

The invention is fully disclosed by way of example in the following description and in the accompanying drawings, in which—

Figure 1 is a vertical cross section of the device, on the line 1—1 of Figure 2;

Fig. 2 is a longitudinal section on the line 2—2 of Figure 1;

Fig. 3 is a section on the line 3—3 of Figure 1;

Fig. 4 is a fragmentary perspective view of the operating arm;

Figs. 5 and 6 are sections on the lines 5—5 and 6—6 respectively of Figure 2;

Fig. 7 is a section on the line 7—7 of Figure 1; and

Fig. 8 is a detail side elevation of a motor vehicle showing the device applied thereto.

Reference to these views will now be made by use of like characters which are employed to designate corresponding parts throughout.

In the several figures the numeral 1 indicates a side frame member of an automobile vehicle on which the shock absorber is mounted. The device is supported essentially on a stud 2 fixed in the member 1. A plate 3 is fitted over a polygonal portion 4 of the stud and secured in the member 1 by means of integral lugs 5, whereby the stud is locked against rotation. The various parts of the mechanism are confined in a casing 6 rotatably mounted on the stud.

The device is operated through an operating arm 7 which has a boss 8 rotatably mounted on the body of the stud 4 and formed with a projecting lug or key 9 for a purpose which will presently be described. The free end of the arm 7 is articulated to a link 10 which in turn is pivoted to a clamp 11 fixed on the axle 12 as shown in Figure 8. The frame member 1 rests on a leaf spring 13 mounted on the axle in the usual manner, and the function of the shock absorber is to cushion the upward movement of the frame on the recoil of the spring after compression.

An arm 14 is rotatably mounted on the stud 2 by means of an integral boss 15 which surrounds the stud as shown more clearly in Figure 5. The boss has a slot 16 receiving the key 9 as shown in the same figure, whereby the arm 14 is locked to the arm 7. The stud 2 has another polygonal portion 17 near its outer end for retaining a non-rotatable ring 18 having a joint finger 19 extending therefrom for a purpose which will presently appear.

In one end of the casing is mounted a pair of primary friction shoes 20 and 21 in contact with each other at one end and spaced apart at the other end as shown in Figure 6. A cam lever 22 is pivotally attached to the arm 14 by a pin 23, as shown in Figure 6, and has its free end received in the space between the shoes 20 and 21. The free end of the member 21 is in the form of an inward extension 24 engaged by the free end of the cam 22 which also receives the free end of the member 20. The relation of these three contacting parts is such that a counterclockwise swinging movement of the arm 14 rocks the end of the cam lever 22 on the extension 24, whereby the cam lever spreads the shoes 20 and 21 into firm engagement with the cylindrical wall of the casing 6.

Located preferably at the opposite end of the casing 6 is a pair of secondary shoes 25 and 26 also engaging the cylindrical wall of the casing 6, in contact with each other at one end and spaced apart at the other end. The free end of the shoe 25 is forked at 27 and receives the tongue or finger 19. To the contacting end of the shoe 26 is pivotally mounted a curved rod 28 extending alongside the shoe 26 substantially as far as the bifurcated end 27. A toggle lever 29 has one of its ends 30 bearing against the pivoted end of the rod 28, while the other end is forked at 31 to receive the free end of the rod 28 as shown more clearly in Figure 2. A spring 32 surrounds the rod 28 between the arm 14 and forked end 31 and is so adjusted as to exert no pressure against either of these parts when the frame member 1 and arm 14 are in their normal or neutral positions as shown in Figures 5 and 8.

By means of a lug or finger 33 which extends inwardly from the end 30 of lever 29, said lever is pivotally connected upon a pin 34' in the other end of the prying or spreading lever 34, and has as a fulcrum the adjacent pivoted end of the supporting rod 28 of the spring 32. The other end of the spreading or prying lever 34 has its free end 35 received in the space between the ends of the shoes 25 and 26 as shown in Figure 1. This end is shaped to engage the fork 27 and the free end of the shoe 26 as also shown in Figure 1.

The casing 6 is finally closed by a cover plate 36, and the various parts assembled on the stud 2 are held together by a nut 37 on one end of the stud, the other end being headed as at 38.

When lever 14, locked to lever 7 by means of the key 9, is in the normal or non-functioning position, the spring 32 is fully distended upon its supporting rod 28 and exerts little or no pressure upon the outer end 31 of the toggle lever 29.

When, however, lever 7 is rotated in a clockwise direction by compression of spring 13 upon the frame 1, lever 14 is similarly rotated and the spring 32 is compressed, thereby exerting upon the free end 31 of lever 29 a pressure, proportionate to the extent of the compression or shock. At the same time the one-way or free-wheel clutch members 20, 21 and 22 are rotated in their free-wheeling or releasing direction and thereby potentially placed to rotate the casing 6 in a counterclockwise direction when the recoil of spring 13 and its consequent recession from the frame 1 rotates lever 7 in a counterclockwise direction to its normal position. Meanwhile the toggle lever 29 receives the pressure of the spring 32 and tends to turn on the pivoted end of the rod 28 as a fulcrum, dragging the pivoted end of the lever 34 in counterclockwise direction. This movement of the lever 34 spreads the secondary shoes 25 and 26 and places them under initial tension or pressure against the casing 6. The articulation of the finger 19 in the fork 27 permits variation in the frictional engagement between the shoe 25 and the casing 6, while preventing both shoes 25 and 26 from turning around the stud 2.

On the recoil of the spring 13, the relative movement of the arm 14 is counterclockwise due to the movements of the link 10 and arm 7. The corresponding pull on the cam lever 22 through the pin 23, spreads the primary shoes 20 and 21 against the casing 6, whereby the casing is forced to rotate due to the clutch action and its rotatable mounting on the stud 2. This turning of the casing, however, is resisted by the initial frictional engagement of the secondary shoes 25 and 26 therewith, and this resistance results in retardation or cushioning of the recoil, inasmuch as the shoes 25 and 26 are held against rotation by means of the finger 19.

As the recoil movement continues, although retarded, the prying action of the cam lever 22 continues until lever 7 completes its movement, so that the primary shoes 20 and 21 are held firmly against the casing 6. During this movement, the arm 14 recedes from the forked end 31 of the toggle lever 29, whereupon the pressure of the spring 32 is lessened and the pressure of the secondary shoes 25 and 26 against the casing 6 is correspondingly decreased. Thus, the retarding or braking action of the shoes 25 and 26 is greatest at the beginning of the recoil and gradually diminishes as the recoil movement continues. The grip of the primary shoes 20 and 21 on the casing 6 turns the casing counterclockwise so that the slippage will occur at the shoes 25 and 26 rather than at the shoes 20 and 21, whereby the diminishing braking action of the shoes 25 and 26 is nevertheless being utilized.

As spring 13 recoils from its compression the frame 1 is raised and lever 7 is thereby rotated in a counterclockwise direction and the free-wheel clutch members 20, 21 and 22 acting in their locking or holding direction rotate the casing 6 likewise in a counterclockwise direction. The free wheel clutch members 20, 21 and 22 do not release until the lever 7 is again rotated in a clockwise direction, when they do release instantaneously. Simultaneously with the recoil of spring 13, counterclockwise rotation of lever 14 gradually slackens the braking pressure of the secondary shoes 25 and 26 on the casing 6 by gradual expansion of the spring 32.

Although a specific embodiment of the invention has been illustrated and described, it will be understood that various alterations in the details of construction may be made without departing from the scope of the invention, as indicated by the appended claims.

What I claim is:

1. A shock absorber comprising a stud, a casing rotatable thereon, an arm rotatable on said stud and adapted for connection to a spring of a vehicle, a pair of primary friction shoes engaging said casing, spreading means operable on said shoes by movement of said arm in one direction, a pair of secondary friction shoes engaging said casing, means holding said secondary shoes against rotation relatively to said stud, and spring means normally holding said secondary shoes against said casing.

2. A shock absorber comprising a stud, a casing rotatable thereon, an arm rotatable on said stud and adapted for connection to a spring of a vehicle, a pair of primary friction shoes engaging said casing, spreading means operable on said shoes by movement of said arm in one direction, a pair of secondary friction shoes engaging said casing, means holding said secondary shoes against rotation relatively to said stud, spring means normally holding said secondary shoes against said casing, and means for proportioning the pressure of said secondary shoes against said casing by movement of said arm in said direction.

3. A shock absorber comprising a stud, a casing rotatable thereon, an arm rotatable on said stud and adapted for connection to a spring of a vehicle, a pair of primary friction shoes engaging said casing, another arm fixed to the first arm, a cam lever connected to the second arm and inserted between said shoes to spread the latter against said casing by movement of the second arm in one direction, a pair of secondary friction shoes engaging said casing, means holding said secondary shoes against rotation relatively to the first arm, and spring means functionally proportioning the pressure of said secondary shoes against said casing.

4. A shock absorber comprising a stud, a casing rotatable thereon, an arm rotatable on said stud and adapted for connection to a spring of a vehicle, a pair of primary friction shoes engaging said casing, another arm fixed to the first arm, a cam lever connected to the second arm and inserted between said shoes to spread the latter against said casing by movement of the second arm in one direction, a pair of secondary friction shoes engaging said casing, means holding said secondary shoes against rotation relatively to the first arm, spring means functionally proportioning the pressure of said secondary shoes against said casing, and means for increasing the pressure of said secondary shoes against said casing by movement of said arm in said direction.

5. A shock absorber comprising a stud, a casing rotatable thereon, an arm rotatable on said stud and adapted for connection to a spring of a vehicle, a pair of primary friction shoes engaging said casing, spreading means operable on said shoes by movement of said arm in one direction, a pair of secondary friction shoes engaging said casing, means holding said secondary shoes against rotation relatively to said stud, a prying lever having one end inserted between said secondary shoes, a toggle lever pivotally mounted upon said prying lever, and fulcrumed upon one of the secondary friction shoes, and a spring slidably mounted and engaging the free end of said toggle lever, to functionally proportion the frictional engagement of the secondary shoes with said casing.

6. A shock absorber comprising a stud, a casing rotatable thereon, an arm rotatable on said stud and adapted for connection to a spring of a vehicle, a pair of primary friction shoes engaging said casing, spreading means operable on said shoes by movement of said arm in one direction, a pair of secondary friction shoes engaging said casing, means holding said secondary shoes against rotation relatively to said stud, a prying lever having one end inserted between said secondary shoes, a toggle lever pivotallly mounted upon said prying lever and fulcrumed upon one of the secondary friction shoes, a spring slidably mounted and engaging the free end of said toggle lever to functionally proportion the frictional engagement of the secondary shoes with said casing, and means for decreasing the pressure of said secondary shoes against said casing by movement of said secondary prying lever in said direction.

7. A shock absorber comprising a stud, a casing rotatable thereon, an arm rotatable on said stud and adapted for connection to a spring of a vehicle, a pair of primary friction shoes engaging said casing, another arm fixed to the first arm, a cam lever connected to the second arm and inserted between said shoes to spread the latter against said casing by movement of the second arm in one direction, a pair of secondary friction shoes engaging said casing, means holding said secondary shoes against rotation relatively to the first arm, a prying lever having one end inserted between said secondary shoes and a spring slidably mounted having one end bearing against said second arm and the other end active upon said secondary prying lever to hold the secondary shoes functionally in frictional engagement with said casing, and means for proportioning the pressure of said secondary shoes against said casing by movement of said arm in said direction.

8. A shock absorber comprising a stud, a casing rotatable thereon, an arm rotatable on said stud and adapted for connection to a spring of a vehicle, a pair of primary friction shoes engaging said casing, another arm fixed to the first arm, a cam lever connected to the second arm and inserted between said shoes to spread the latter against said casing by movement of the second arm in one direction, a pair of secondary friction shoes engaging said casing, means holding said secondary shoes against rotation relatively to the first arm, a prying lever having one end inserted between said secondary shoes, a toggle lever pivotally mounted upon said prying lever and fulcrumed on one of said secondary shoes, and spring mounted between said second arm and the free end of said toggle lever, whereby to spread said secondary shoes against said casing through said prying lever.

9. A shock absorber comprising a stud, a casing rotatable thereon, an arm rotatable on said stud and adapted for connection to a spring of a vehicle, a one-way clutch fitted into said casing and comprised of a pair of primary friction shoes engaging said casing, together with leverage spreading means operable upon said shoes by movement of said arm in one direction, a secondary one-way clutch engaging said casing and having friction shoes anchored agaist rotation relative to said stud, and spring means functionally proportioning the pressure of said secondary shoes against said casing.

In testimony whereof I affix my signature.

ARTHUR THOMSON.